Nov. 11, 1958  R. BRUNSTING ET AL  2,859,930
RECESSED WALL FIXTURE MOUNTING
Filed July 18, 1956  2 Sheets-Sheet 1

INVENTORS
Ralph Brunsting
Clarence M. Casselman
By Otto A. Earl
Attorney

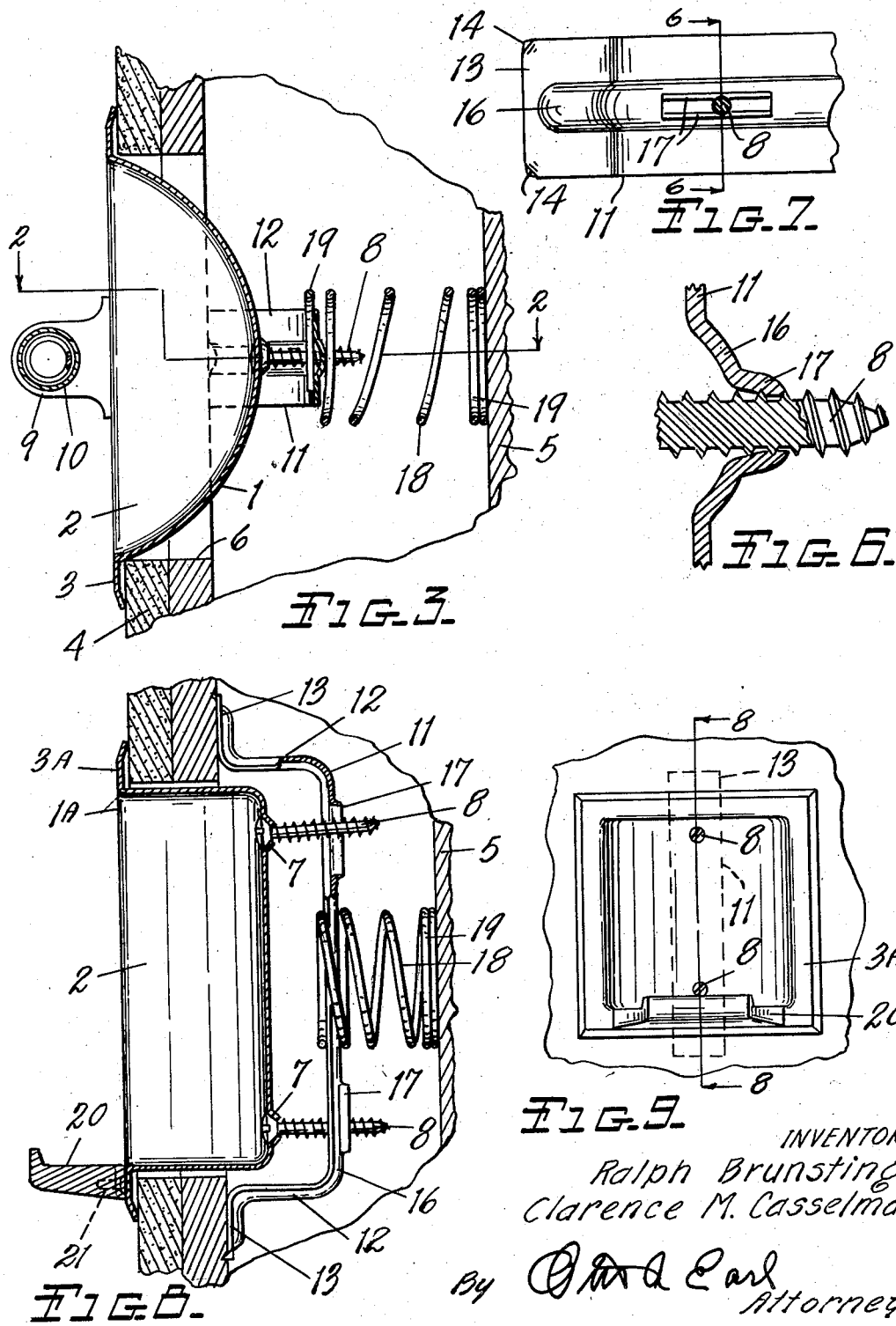

United States Patent Office 2,859,930
Patented Nov. 11, 1958

2,859,930

RECESSED WALL FIXTURE MOUNTING

Ralph Brunsting and Clarence M. Casselman, Kalamazoo, Mich.

Application July 18, 1956, Serial No. 598,696

6 Claims. (Cl. 248—27)

This invention relates to improvements in a recessed wall fixture mounting and constitutes a continuation in part of our copending application, Serial No. 355,478 filed May 18, 1953 for Wall Fixture Mounting. The principal objects of this invention are:

First, to provide a retaining fitting that is easily mountable through a hole in a hollow wall to be self sustaining behind the wall for securely receiving attaching screws from a fixture mounted in the hole.

Second, to provide a retaining fitting that is clampable to a recessed wall fixture on the opposite side of a wall from the fixture to retainingly clamp the fitting and fixture to opposite sides of the wall, which fitting has a spring easily connected thereto for holding the fitting in engagement with the wall prior to clamping engagement between the fitting and the fixture.

Third, to provide a fitting having the foregoing objects and the objects of the above mentioned copending application that is less expensive, more easy to assemble and more secure in its connections than the structure of the copending application.

Other objects and advantages of the invention will be apparent from a consideration of the following description and claims. The drawings, of which there are two sheets, illustrate a highly practical form of the invention.

Fig. 1 is a front elevational view of a recessed wall fixture such as the fitting of the invention is designed to coact with.

Fig. 3 is a fragmentary cross sectional view taken along the plane of the line 3—3 in Fig. 2.

Fig. 6 is an enlarged fragmentary elevational view of the screw connection to the fitting of the invention.

Fig. 7 is an enlarged fragmentary cross sectional view taken along the plane of the line 7—7 in Fig. 6.

Fig. 8 is a vertical cross sectional view through a modified form of wall fixture and its mounting in a wall recess and taken along the plane of the line 8—8 in Fig. 9.

Fig. 9 is a front elevational view of the fixture and mounting shown in Fig. 8.

Figure 1:
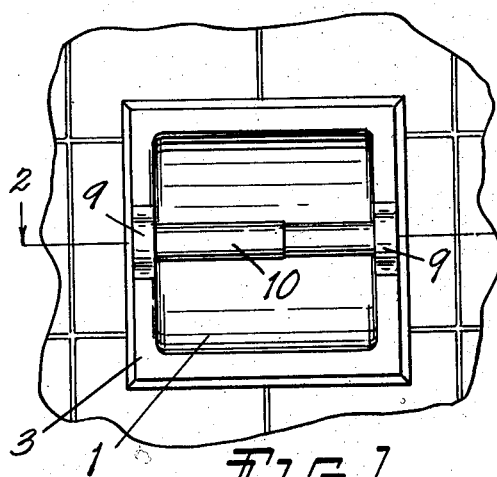
Figure 2:
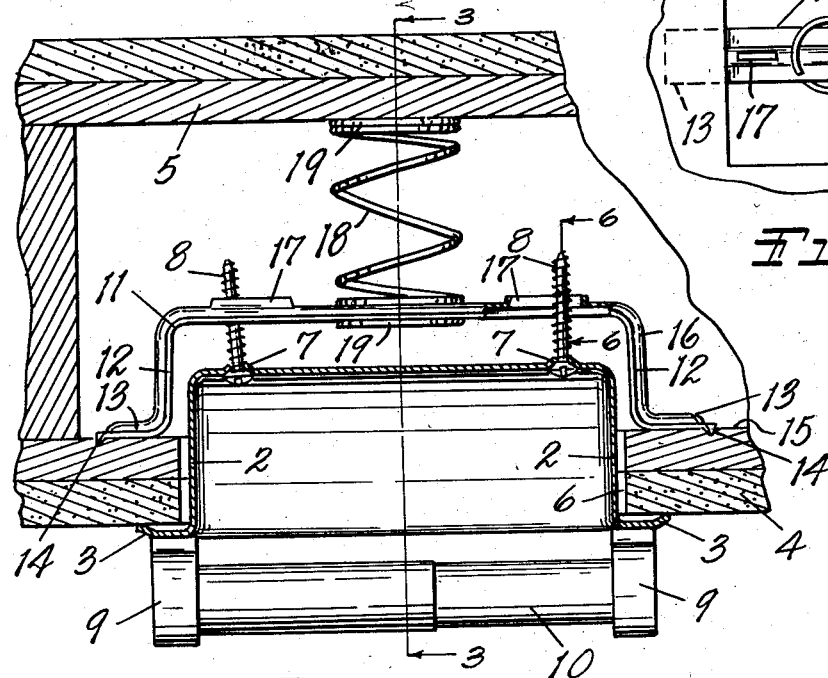
Fig. 2 is an enlarged fragmentary cross sectional view taken along the plane of the line 2—2 in Fig. 1.

The present invention provides a fitting and clamp that holds a recessed wall fixture such as a toilet paper holder or soap dish in a hole in a hollow or chambered wall without the necessity of screws or fasteners being driven into the outer face of the wall. Figs. 1, 2 and 3 show such a fixture in the form of a semi-cylindrical toilet paper receiver 1 having segmental end walls 2 and a rectangular peripheral flange 3 adapted to overhang and be clamped against the outer face of the outer wall 4 of a hollow or chambered wall having an inner wall 5 spaced from the outer wall. A hole 6 in the outer wall receives the recessed portion of the receiver. Counter sunk screw holes 7 in the back of the recessed receiver receive and pass sheet metal or high pitch screws 8. Ears 9 on the flange 3 form spindle bearings for the spindle 10 on which a roll of toilet paper may be mounted.

The holder member 11 of this improved assembly is a U-shaped metal stamping long enough to embrace the cylindrical body of the wall fixture and span the hole 4. The arms 12 of the holder have laterally outwardly turned feet or extensions 13 on their ends. The feet have outwardly projecting teeth 14 adapted to bite into the inner surface 15 of the outer wall 4 while the surface of the feet abuts against the wall. The holder is provided with a longitudinal reinforcing rib 16 bent rearwardly and outwardly along its base and arms.

The base of rib 16 is slit and folded rearwardly in opposed pairs of converging flanges 17 at two longitudinally spaced points therealong. The slits register transversely with the holes 7 in the receiver. The elongated length of the slits and flanges permit them to register with a variety of receivers with different hole spacings so the same holder will coact with a variety of receivers. The screws 8 form their own threads in the flanges in being driven through the slits. Desirably, the screws of each assembly are driven through the holes in the receiver into the slits and then removed to pre-thread the flanges before mounting of the holder in the hollow wall. As is best shown in Fig. 6, the converging flanges 17 are engaged by several turns of the threads on the screws 8 to obtain a strong clamping action between the holder and the receiver. The clamping action clamps the flange 3 on the receiver and the feet 13 on the holder on the opposite surfaces of the outer wall to hold the parts in operative position.

Figure 5:
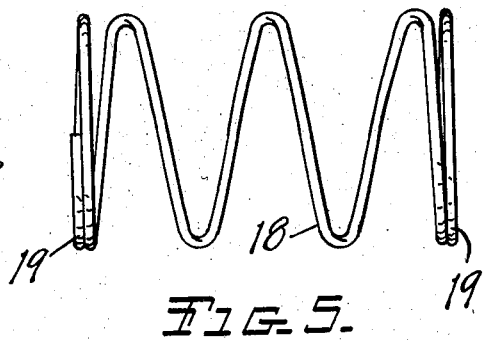
Fig. 5 is an elevational view of the spring that holds the fitting in place in a wall recess.
Figure 4:
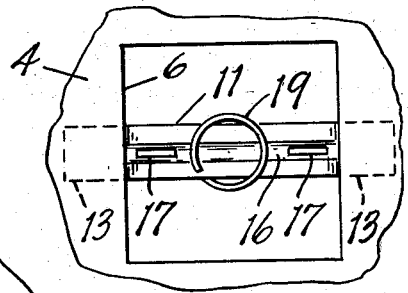
Fig. 4 is a front elevational view of the fitting of the invention in place in an opening in a wall prior to the attachment of the wall fixture thereto.

The holder 11 is inserted endwise into the hole 4 and is tilted or twisted into engagement with the wall 4 after being inserted into the hollow of the wall. The holder is held temporarily in position by a helical coil spring 18 that is compressed against the rear or outer wall 5 in installing the holder. The spring has tightly lapped terminal coils 19 at each end as is best shown in Fig. 5. The coils 19 are parallel and so abut the wall flatwise without applying a tilting action to the holder. At the outer end of the spring the close wound coils are lapped on opposite sides of the holder 11 by simply sliding the cross bar of the holder between the adjacent coils.

Figs. 8 and 9 show a modified form of the recessed fixture in the form of a soap dish or rack. The fixture 1A may be the same size and shape as the fixture 1 but is arranged on end with respect to the semi-cylindrical body 2 thus placing a segmental end wall at the bottom of the fixture. The peripheral flange 3A overlies the wall as in the first form of the fixture but has a shelf 20 secured to its lower edge by studs or pins 21 to form an extension of the lower wall 2.

The other elements of the fixture including the holder 11 spring 19 and screws 8 are the same as in the first form of the fixture except that the holder is disposed vertically in the wall to register with the holes 7 in the fixture. The recess in the fixture is jointless within the wall so any drip or overflow from the soap dish is directed outwardly over the front flange 3. The fixture and holder can obviously be adapted to other uses embodying a recessed portion fitted into a hole in a wall.

Having thus described the invention, what is claimed as new and is desired to be secured by Letters Patent is:

1. The combination with a wall fixture having a recessed portion adapted to be inserted in an opening in the front wall of a double wall and having an outwardly turned peripheral flange adapted to seat against the surface of said front wall with a holder of U-shaped formation adapted to embrace said recessed portion and having laterally outwardly turned feet opposed to said flange and adapted to engage the inner surface of said outer wall in opposition to said flange, wall engaging teeth on said feet, a rearwardly curved reinforcing rib formed longitudinally along said holder, longitudinally spaced slits formed in the base of said rib at longitudinally spaced positions along the base of the U-shaped holder, rearwardly projecting and converging flanges along the sides of said slits, countersunk screw holes formed in the back of said recessed portion and adapted to register with said slits, sheet metal screws passed through said screw holes and threadingly engaged through said slits with the flanges along side the slits, and a helically coiled spring engaged with the mid-section of said U-shaped holder and adapted to be compressed against the rear wall of said double wall when said holder is inserted between the walls, said spring having closely turned adjacent coils at each end arranged perpendicular to the axis of the coil with the adjacent coils at one end of the spring adapted to have the holder slide transversely therebetween, and means including spindle bearing ears on the front of said fixture adapted to retain articles within the recess of the fixture.

2. The combination with a wall fixture having a recessed portion adapted to be inserted in an opening in the front wall of a double wall and having an outwardly turned peripheral flange adapted to seat against the surface of said front wall with a holder of U-shaped formation adapted to embrace said recessed portion and having laterally turned feet opposed to said flange and adapted to engage the inner surface of said outer wall in opposition to said flange, wall engaging teeth on said feet, a rearwardly offset reinforcing rib formed longitudinally along said holder, longitudinally spaced slits formed in the base of said rib at longitudinally spaced positions along the base of the U-shaped holder, rearwardly projecting and converging flanges along the sides of said slits, screw holes formed in the back of said recessed portion and adapted to register with said slits, screws passed through said screw holes and theadingly engaged through said slits with the flanges along side the slits, and a helically coiled spring engaged with the mid-section of said U-shaped holder and adapted to be compressed against the rear wall of said double wall when said holder is inserted between the walls, said spring having closely turned adjacent coils at each end arranged perpendicular to the axis of the coil with the adjacent coils at one end of the spring having the holder slid transversely therebetween, and means on the front of said fixture adapted to retain articles within the recess of the fixture.

3. The combination with a wall fixture having a recessed portion adapted to be inserted in an opening in the front wall of a double wall and having an outwardly turned peripheral flange adapted to seat against the surface of said front wall with a holder of U-shaped formation adapted to embrace said recessed portion and having laterally turned feet opposed to said flange and adapted to engage the inner surface of said outer wall in opposition to said flange, a rearwardly offset reinforcing rib formed longitudinally along said holder, longitudinally spaced slits formed in the base of said rib at longitudinally spaced positions along the base of the U-shaped holder, rearwardly projecting and converging flanges along the sides of said slits, screw holes formed in the back of said recessed portion and adapted to register with said slits, screws passed through said screw holes and threadingly engaged through said slits with the flanges along side the slits, and a helically coiled spring engaged with the mid-section of said U-shaped holder and adapted to be compressed against the rear wall of said double wall when said holder is inserted between the walls, and said spring having closely turned adjacent coils at each end arranged perpendicular to the axis of the coil with the adjacent coils at one end of the spring having the holder slid transversely therebetween.

4. A holder for a wall fixture having a recessed portion adapted to be inserted in an opening in the front wall of a double wall and having an outwardly turned peripheral flange adapted to seat against the surface of said front wall comprising a U-shaped member adapted to embrace said recessed portion and having laterally outwardly turned feet opposed to said flange and adapted to engage the inner surface of said outer wall in opposition to said flange, wall engaging teeth on said feet, a rearwardly offset reinforcing rib formed longitudinally along said holder, longitudinally spaced slits formed in the base of said rib at longitudinally spaced positions along the base of the U-shaped holder, rearwardly projecting and converging flanges along the sides of said slits, sheet metal screws adapted to be passed through said fixture and threadingly engaged through said slits with the flanges along side the slits, and a helically coiled spring engaged with the mid-section of said U-shaped holder and adapted to be compressed against the rear wall of said double wall when said holder is inserted between the walls, said spring having closely turned adjacent coils at each end arranged perpendicular to the axis of the coil with the adjacent coils at one end of the spring having the holder slid transversely therebetween.

5. A holder for a wall fixture having a recessed portion adapted to be inserted in an opening in the front wall of a double wall and having an outwardly turned peripheral flange adapted to seat against the surface of said front wall comprising a U-shaped member adapted to embrace said recessed portion and having laterally turned feet to engage the inner surface of said outer wall in opposition to said flange, a rearwardly offset reinforcing rib formed longitudinally along said holder, longitudinally spaced slits formed in the base of said rib at longitudinally spaced positions along the base of the U-shaped holder, rearwardly projecting and converging flanges along the sides of said slits, screws adapted to be passed through said fixture and threadingly engaged through said slits with the flanges along side the slits, and a helically coiled spring engaged with the mid-section of said U-shaped holder and adapted to be compressed against the rear wall of said double wall when said holder is inserted between the walls, said spring having closely turned adjacent coils at one end arranged perpendicular to the axis of the coil with the adjacent coils having the holder slid transversely therebetween.

6. A holder for a wall fixture having a recessed portion adapted to be inserted in an opening in the front wall of a double wall and having an outwardly turned peripheral flange adapted to seat against the surface of said front wall comprising a U-shaped member adapted to embrace said recessed portion and having outwardly facing surfaces on the ends of its arms adapted to engage the inner surface of said outer wall in opposition to said flange, an offset reinforcing rib formed longitudinally along said holder, longitudinally spaced slits formed in the base of said rib at longitudinally spaced positions along the base of the U-shaped holder, rearwardly projecting and converging flanges along the sides of said slits, sheet metal screws adapted to be passed through said fixture and threadingly engaged through said slits with the flanges along side the slits, and a helically coiled spring engaged with the mid-section of said U-shaped holder and adapted to be compressed against the rear wall of said double wall when said holder is inserted between the walls, said spring having closely turned adjacent coils at each end arranged perpendicular to the axis of the coil with the adjacent coils at one end of the spring having the holder slid transversely therebetween.

References Cited in the file of this patent

UNITED STATES PATENTS

| | | |
|---|---|---|
| 130,043 | Hard | July 30, 1872 |
| 1,156,885 | Caine | Oct. 19, 1915 |
| 2,406,587 | Cooper | Aug. 27, 1946 |
| 2,604,285 | Knoch | July 22, 1952 |
| 2,703,663 | Connett | Mar. 8, 1955 |

FOREIGN PATENTS

| | | |
|---|---|---|
| 646,406 | Great Britain | Nov. 22, 1950 |